(12) United States Patent
Eickemeyer et al.

(10) Patent No.: US 10,915,446 B2
(45) Date of Patent: Feb. 9, 2021

(54) PREFETCH CONFIDENCE AND PHASE PREDICTION FOR IMPROVING PREFETCH PERFORMANCE IN BANDWIDTH CONSTRAINED SCENARIOS

(71) Applicant: International Business Machines Corporation, Armonk, NY (US)

(72) Inventors: Richard J. Eickemeyer, Rochester, MN (US); John B. Griswell, Jr., Austin, TX (US); Mohit S. Karve, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/949,381

(22) Filed: Nov. 23, 2015

(65) Prior Publication Data
US 2017/0147493 A1    May 25, 2017

(51) Int. Cl.
*G06F 12/08* (2016.01)
*G06F 12/0862* (2016.01)

(52) U.S. Cl.
CPC .. *G06F 12/0862* (2013.01); *G06F 2212/1016* (2013.01); *G06F 2212/6022* (2013.01)

(58) Field of Classification Search
CPC ......... G06F 12/0862; G06F 2212/6022; G06F 2212/1016
See application file for complete search history.

(56) References Cited

U.S. PATENT DOCUMENTS

| | | | |
|---|---|---|---|
| 6,487,639 B1 * | 11/2002 | Lipasti | G06F 9/383 |
| | | | 711/119 |
| 7,472,256 B1 | 12/2008 | Nair et al. | |
| 2002/0099926 A1 | 7/2002 | Sinharoy | |
| 2007/0101100 A1 | 5/2007 | Al Sukhni et al. | |
| 2009/0006813 A1 | 1/2009 | Singhal et al. | |
| 2009/0198964 A1 | 8/2009 | Xiao et al. | |

(Continued)

FOREIGN PATENT DOCUMENTS

WO    2008122662 A1    10/2008

OTHER PUBLICATIONS

Stevenson, Angus (Ed.). 2010. Drop. Oxford dictionary of english (p. 537). OUP Oxford. ISBN: 0199571120, 9780199571123. Web: <https://books.google.com/books?id=anecAQAAQBAJ&lpg=PA537&ots=TZjxbvnFDO&dq=%22Abandon%20or%20discontinue%20(a%20course%20of%20action%20or%20study)%22&pg=PA537#v=onepage&q=%22Abandon%20or%20discontinue%20(a%20course%20of%20action%20or%20study)%22&f=false>.*

(Continued)

*Primary Examiner* — Reginald G Bragdon
*Assistant Examiner* — Thanh D Vo
(74) *Attorney, Agent, or Firm* — Patterson + Sheridan, LLP (57) ABSTRACT

Techniques are disclosed for identifying data streams in a processor that are likely to benefit from data prefetching. A prefetcher receives at least a first request in a plurality of requests to pre-fetch data from a stream in a plurality of streams. The prefetcher assigns a confidence level to the the first request based on an amount of confirmations observed in the stream. The request is in a confident state if the confidence level exceeds a specified value. The first request is in a non-confident state if the confidence level does not exceed the specified value. Doing so allows a memory controller to determine whether to drop the at least the first request based on the confidence level and a memory resource utilization threshold.

11 Claims, 6 Drawing Sheets

(56) References Cited

U.S. PATENT DOCUMENTS

| | | | |
|---|---|---|---|
| 2009/0199190 A1* | 8/2009 | Chen | G06F 9/383 |
| | | | 718/102 |
| 2010/0077154 A1* | 3/2010 | Chou | G06F 12/0862 |
| | | | 711/137 |
| 2010/0241811 A1 | 9/2010 | Solihin | |
| 2013/0124829 A1 | 5/2013 | Chou et al. | |
| 2014/0019721 A1 | 1/2014 | Stavrou et al. | |
| 2014/0108740 A1* | 4/2014 | Rafacz | G06F 12/0862 |
| | | | 711/137 |
| 2014/0149679 A1* | 5/2014 | Rowlands | G06F 12/0862 |
| | | | 711/137 |

OTHER PUBLICATIONS

N. Kirman et al.: "Checkpointed Early Load Retirement", Intl. Symp. on High-Performance Computer Architecture (HPCA), San Francisco, CA, Feb. 2005.

H. Zhou et al.: "Enhancing Memory Level Parallelism via Recovery-Free Value Prediction", ICS '03, Jun. 23-26, 2003, San Francisco, CA.

Y. Chen et al: "Global-Aware and Multi-Order Context-Based Prefetching for High-Performance Processors", The International Journal of High Performance Computing Applications 25(4), 2011, pp. 355-370.

* cited by examiner

PREFETCH CONFIDENCE AND PHASE PREDICTION FOR IMPROVING PREFETCH PERFORMANCE IN BANDWIDTH CONSTRAINED SCENARIOS

BACKGROUND

Embodiments presented herein are related to data prefetching in a processor, and more specifically, to identifying data streams that benefit from prefetching based on stream depth and memory bandwidth constraints.

Data prefetching is a technique that allows a processor to reduce stall time on data accesses. Rather than waiting for a cache miss to initiate a memory fetch, a prefetcher in the processor observes, e.g., in a cache memory, data streams referencing patterns and predicts future references based on such patterns. The prefetcher then retrieves the predicted reference data from the cache memory before the processor actually references the data. Doing so allows the processor to reduce memory access latency and thus increase performance of the processor.

Generally, data prefetch techniques establish streams based on predicted patterns. An initial access to an established stream is referred to as an allocation. Further, each subsequent access to that stream (i.e., an actual demand for a given cache line) is referred to as a confirmation. The prefetcher may determine whether to issue a request to prefetch data from a given stream based on the depth of the stream, i.e., an amount of confirmations observed in the stream. Typically, the prefetcher may drop requests if the depth for the stream is low, e.g., the stream has no confirmations. However, one drawback to such an approach is that, occasionally, once the prefetch engine observes at least one confirmation, the prefetcher may determine that the next subsequent accesses to the stream are sequential cache lines and, as a result, blindly issues prefetch requests, even if the accesses do not correspond to sequential cache lines. Consequently, such an approach may consume more bandwidth than necessary.

SUMMARY

One embodiment presented herein discloses a method. This method generally includes receiving at least a first request in a plurality of requests to pre-fetch data from a stream in a plurality of streams. The method also includes assigning a confidence level to the at least the first request based on an amount of confirmations observed in the stream. The first request is in a confident state if the confidence level exceeds a specified value. The first request is in a non-confident state if the confidence level does not exceed the specified value. The method also includes determining whether to drop the at least the first request based on the confidence level and a memory resource utilization threshold.

Another embodiment presented herein discloses a processor that includes a prefetcher. The prefetcher is configured to receive at least a first request in a plurality of requests to pre-fetch data from a stream in a plurality of streams. The prefetcher is also configured to assign a confidence level to the at least the first request based on an amount of confirmations observed in the stream. The first request is in a confident state if the confidence level exceeds a specified value. The first request is in a non-confident state if the confidence level does not exceed the specified value. The prefetcher is also configured to determine whether to drop the at least the first request based on the confidence level and a memory resource utilization threshold.

Another embodiment presented herein discloses a system. The system includes a memory and a processor. The processor includes a prefetcher that is configured to receive at least a first request in a plurality of requests to pre-fetch data from a stream in a plurality of streams. The prefetcher is also configured to assign a confidence level to the at least the first request based on an amount of confirmations observed in the stream. The first request is in a confident state if the confidence level exceeds a specified value. The first request is in a non-confident state if the confidence level does not exceed the specified value. The prefetcher is also configured to determine whether to drop the at least the first request based on the confidence level and a memory resource utilization threshold.

DETAILED DESCRIPTION

Embodiments presented herein disclose techniques for improving data prefetch performance in a processor. More specifically, techniques provide a prefetcher in the processor of a computer system that tracks streams of data accesses spread over one or more threads in a processor core. The prefetcher includes a prefetch request queue that tracks an amount of confirmations (i.e., actual demands for cache lines) observed for a given stream. Further, the prefetch request queue maintains an amount of prefetch requests issued to memory for each stream and schedules subsequent requests to be issued.

In one embodiment, the prefetch request queue assigns a confidence level to each request. The confidence level may indicate a degree at which confirmations have been observed in a stream associated with that request. For example, if a relatively high number of confirmations is observed in a particular stream, requests associated with that stream may have a high confidence level. A high confidence level may indicate that the stream depth is relatively large, and thus, the stream may benefit from prefetching data. As another example, if zero to a relative few amount of confirmations are observed in the stream, the requests associated with that stream may have a low confidence level. A low confidence level may indicate that the stream is recently established and might not benefit from prefetching.

In one embodiment, a memory controller in the computer system may determine which prefetch requests to issue or drop based on a respective confidence level and current memory resource utilization. For example, if the memory resource utilization is currently high, the memory controller may determine to drop requests having a lower confidence level. The memory controller may adjust confidence level thresholds based on the current memory resource utilization, such that the memory controller further drops lower confidence level requests as the memory resource utilization increases.

Further, the prefetcher includes a phase prediction component that maintains a counter for each thread executing in the processor. Each counter tracks the number of prefetch requests in a confident state (i.e., confidence levels exceeding a specified threshold) and the number of prefetch requests in a non-confident state (i.e., confidence levels that do not exceed the specified threshold). For example, the prefetcher may increment the thread-specific counter for each prefetch request in a confident state and decrement for each prefetch request in a non-confident state. The prefetcher may determine whether to increase or decrease a rate at which prefetches occur for a given stream based on the thread-specific counter, as well as current memory resource utilization. In particular, the prefetcher may determine whether to select an aggressive or a delayed ramp to apply towards a given stream. For instance, the prefetcher may select an aggressive ramp for streams of a thread where the counter exceeds a given threshold. That is, a thread having a high counter likely has a considerable amount of confirmations observed in the data streams of the thread. Thus, prefetching at an aggressive rate may be beneficial for streams of such threads. By contrast, the prefetcher may select a delayed ramp for streams in a thread where the counter does not exceed the threshold. Further, the prefetcher may select an aggressive ramp for such threads if the current memory resource utilization is low. That is, if utilization is low, bandwidth may be more efficiently used by advancing more streams through the prefetcher.

Advantageously, techniques presented herein allow a processor to optimize prefetch efficiency relative to current memory resource utilization and constraints. By assigning a confidence level to each prefetch request in a stream based on depth of the stream, the prefetcher prioritizes streams that are likely to benefit from prefetching and streams where prefetching does not result in much performance benefit. Accordingly, the prefetcher may adaptively adjust rates at which prefetching for a given stream occurs. In addition, the memory controller can determine, based on confidence level, prefetch requests to drop to conserve memory usage bandwidth.

Figure 1:
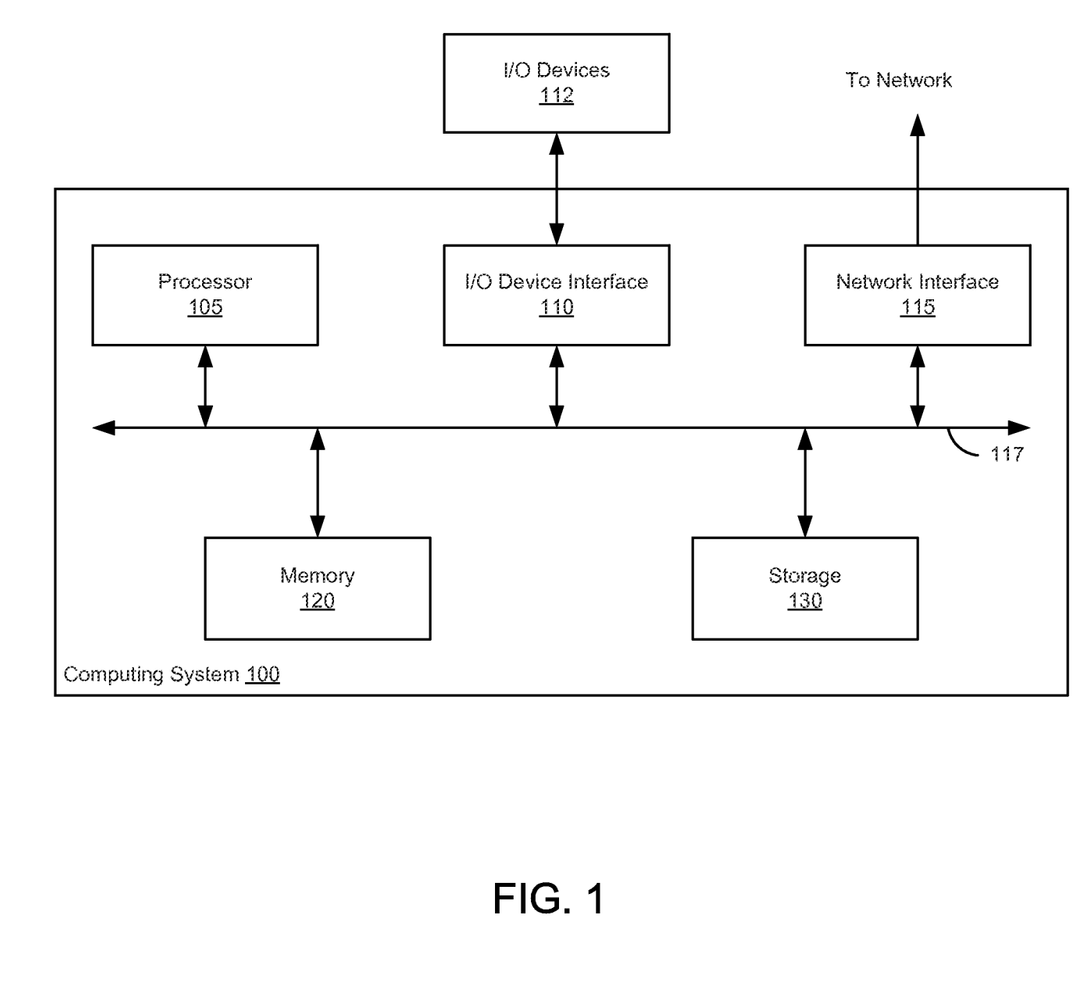
FIG. 1 illustrates an example computing system configured with a processor that identifies data streams that benefit from prefetching based on stream depth and memory bandwidth constraints, according to one embodiment.

FIG. 1 illustrates an example computing system 100 configured with a processor that identifies data streams that benefit from prefetching based on stream depth and memory bandwidth constraints, according to one embodiment. As shown, the computing system 100 further includes, without limitation, a network interface 115, a memory 120, and a storage 130, each connected to a bus 117. The computing system 100 may also include an I/O device interface 110 connecting I/O devices 112 (e.g., keyboard, display, and mouse devices) to the computing system 100. Further, in context of the present disclosure, the computing system 100 is representative of a physical computing system, e.g., a desktop computer, laptop computer, etc. Of course, the computing system 100 will include a variety of additional hardware components.

The processor 105 retrieves and executes programming instructions stored in the memory 120 as well as stores and retrieves application data residing in the storage 130. The bus 117 is used to transmit programming instructions and application data between the processor 105, I/O device interface 110, network interface 115, memory 120, and storage 130. The memory 120 is generally included to be representative of a random access memory. The memory 120 stores program instructions and operand data used by the processor 105. The storage 130 may be a combination of fixed and/or removable storage devices, such as fixed disc drives, removable memory cards, or optical storage, network attached storage (NAS), or a storage-area network (SAN).

Figure 2:
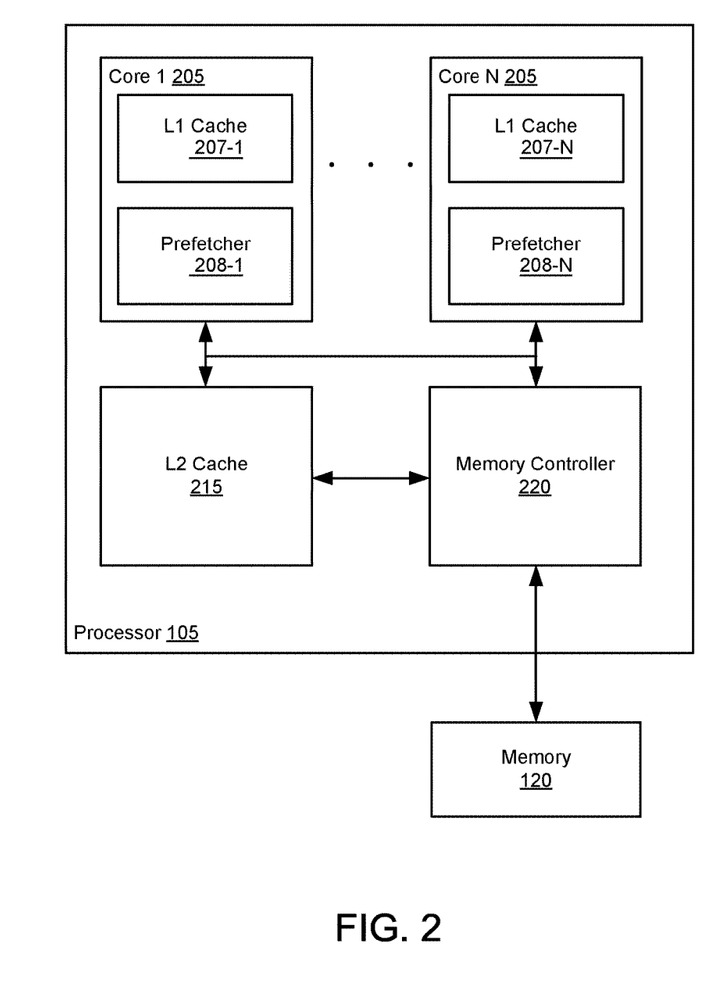
FIG. 2 further illustrates the processor described relative to FIG. 1, according to one embodiment.

FIG. 2 further illustrates the processor 105 configured to identify data streams that are likely to benefit from prefetching based on stream depth and memory resource utilization, according to one embodiment. As shown, the processor 105 includes one or more cores, from core 1 205 to core N 205, a Level 2 (L2) cache 215, and a memory controller 220. Of course, the processor 105 may include a variety of additional components.

As shown, the cores 205 each include a Level 1 (L1) cache 207 (illustrated as L1 caches 207-1 to 207-N, collectively L1 caches 207), and a prefetcher 208 (illustrated as prefetchers 208-1 to 208-N, each referred to as a prefetcher 208 herein). Each prefetcher 208 identifies and prefetches access patterns of the memory 120. Further, each prefetcher 208 manages a cache structure for prefetch streams, e.g., on each L1 cache 207. Further still, each prefetcher 208 predicts which of the streams will be required by the processor 105.

The L1 caches 207 and L2 cache 215 may include separate instruction and data caches implemented using high speed memory devices. The caches 207 and 215 may temporarily store values that might be repeatedly accessed by the processor 105 to more quickly process data, e.g., by avoiding loading values directly from the memory 120. Additional cache levels (e.g., a Level 3 (L3) cache) may be provided. Each cache level from highest (L1) to lowest (L3) may successively store more information, but at a longer access penalty. Further, each cache includes a number of memory blocks that individually store various instructions and data values. A cache line, or a memory block in the cache, can include a variety of fields, such as an address field and a value field.

In one example embodiment, prefetcher 208-1 prefetches data from established streams in core 1 205. To do so, prefetcher 208-1 (referred to in this example as the prefetcher 208) may include logic that detects monotonically increasing or decreasing sequences of demand accesses to cache lines having a common address spacing. Once established, an initial access to the stream is referred to as an allocation. Further, each subsequent access to that stream (i.e., an actual demand for a given cache line) is referred to as a confirmation. A depth associated with a stream is based on the amount of confirmations observed in the stream.

As further described below, the prefetcher 208 may assign a confidence level to each prefetch request for a given stream. The confidence level may be based on a depth of a stream associated with a request, as the stream depth indicates how many sequential demand load instances are observed in the stream. The prefetcher 208 may assign a low confidence level to a request associated with a stream having a relatively low amount of confirmations. The confidence level may be higher with the greater amount of confirmations observed in the stream. A high confidence level indicates that issuing the particular prefetch request is likely to be required by the processor 105.

In one embodiment, the memory controller 220 is configured to receive prefetch requests from a prefetcher 208. The memory controller 220 may determine, based on confidence levels, whether to drop requests or honor prefetch requests. For example, in the event that memory bandwidth is constrained, the memory controller 220 may drop lower-level prefetch requests. And the more constrained the memory bandwidth becomes, the memory controller 220 may decide to only honor prefetch requests of the highest confidence level. In one embodiment, the memory controller 220 may evaluate a threshold profile to determine which level requests to drop based on current utilization. The threshold profile may be based on utilization over an amount of past cycles. For instance, if memory resource utilization was relatively low during the past amount of cycles, the memory controller 220 may honor lower-level prefetch requests. In practice, a threshold profile based on utilization during the past 1,000 cycles has shown to be effective.

Further, the prefetcher 208 may maintain a counter for each thread executing in the processor 105. The counter tracks requests in a confident state (i.e., having a confidence level that exceeds a given threshold) and those in a non-confident state. For example, the counter may increment each time the prefetcher 208 observes a request in a confident state and decrement each time the prefetcher 208 observes a request in a non-confident state. As further described below, the prefetcher 208 may predict well-performing streams based on the counter. Doing so allows the prefetcher 208 to determine which streams to aggressively ramp based on the prediction.

Figure 3:
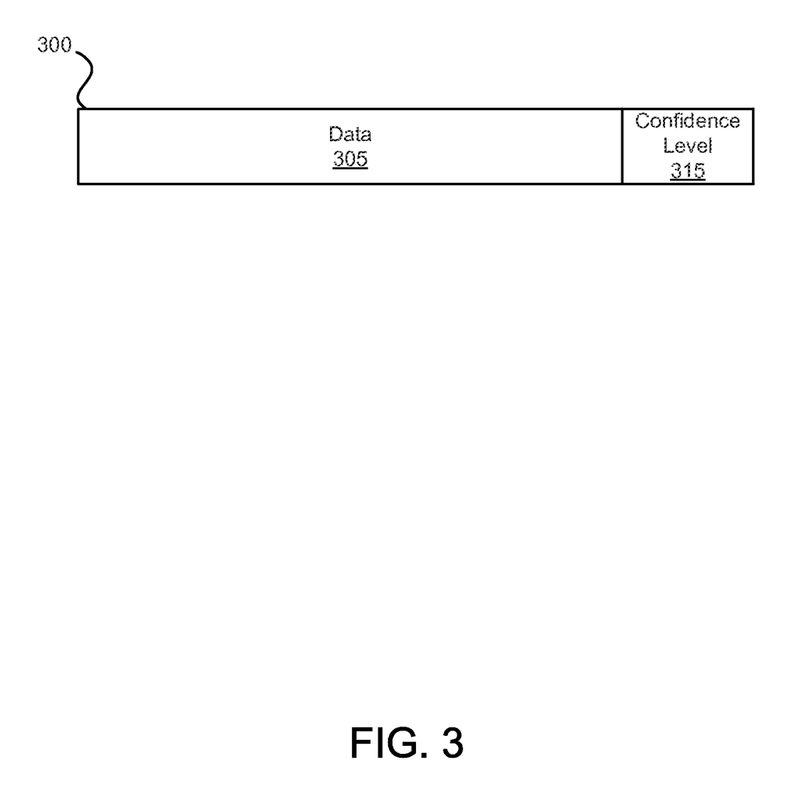
FIG. 3 illustrates an example prefetch request that includes a field specifying a confidence level associated with the request, according to one embodiment.

FIG. 3 illustrates an example prefetch request 300 that includes a field specifying a confidence level associated with the request, according to one embodiment. As shown, the prefetch request 300 includes request data 305 and a confidence level 315. The request data 305 may specify information associated with the request, such as a data address, thread identifier, stream identifier, and a prefetch source.

As stated, the prefetcher 208 may add a confidence level to each request 300 based on a depth (i.e., a number of confirmation accesses) of a stream. In one embodiment, the confidence level 315 is a 2-bit field representing levels 0-3, where confidence level 0 represents the lowest confidence level and where confidence level 3 represents the highest confidence level.

Each level may be associated with a specified amount of confirmations. For instance, prefetch requests of confidence level 0 may be associated with streams that have zero to one confirmations. In such a case, the stream may only have an allocation access and one confirmation (i.e., the stream depth is low). Prefetch requests of confidence level 1 may include up to four confirmations, and prefetch requests of confidence level 2 may include up to eight confirmations. Prefetch requests of confidence level 3 may have greater than eight confirmations. Such confidence level 3 requests may be indicative of sections in code that may benefit from aggressive prefetching. Various components of the prefetcher 208 may evaluate stream performance based on confidence levels of the requests and act in response to such an evaluation, e.g., prioritizing certain streams over others. Likewise, the memory controller 220 may determine which requests to prioritize based on current memory resource utilization.

Figure 4:
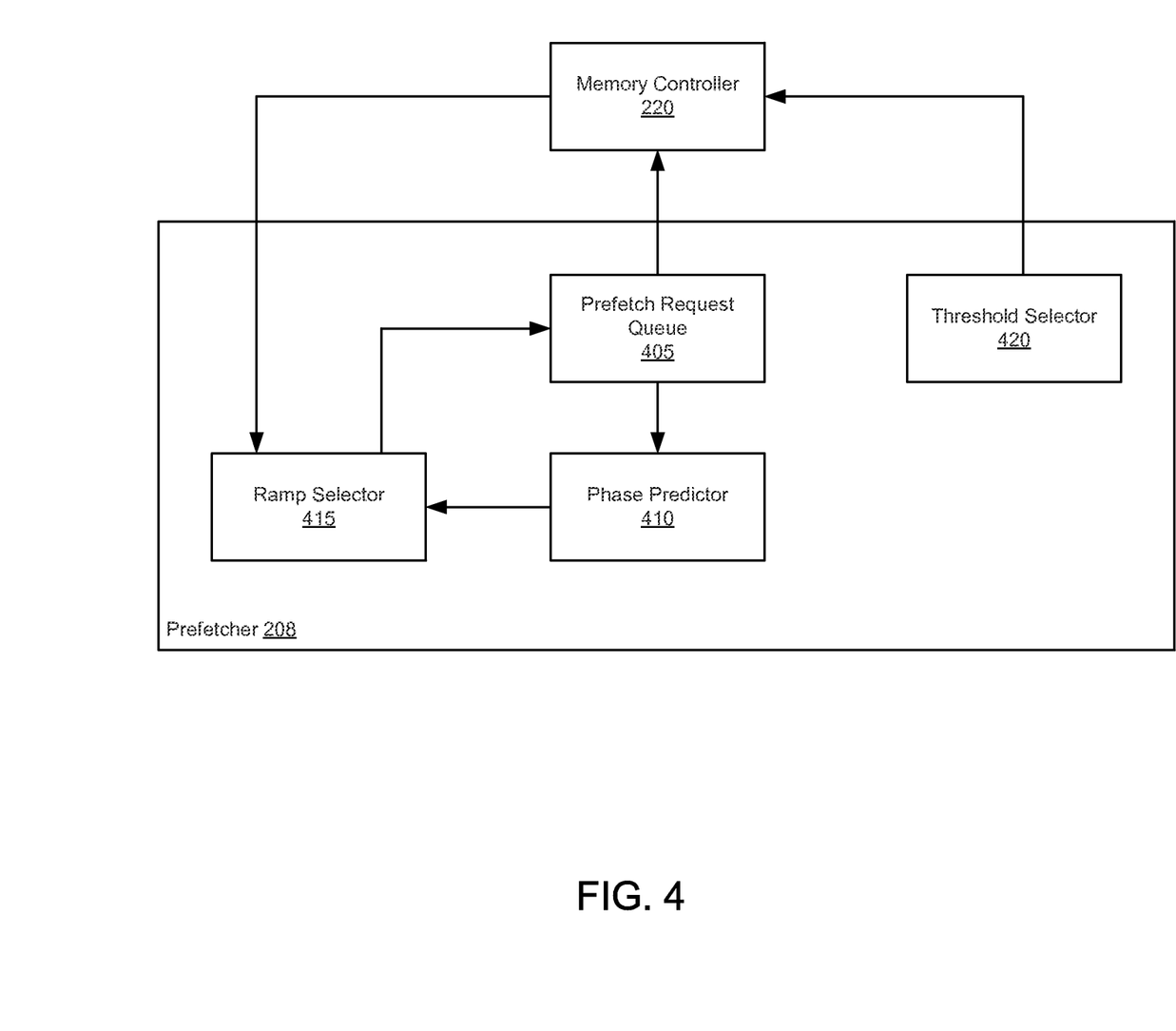
FIG. 4 illustrates an example prefetcher, according to one embodiment.

FIG. 4 illustrates an example prefetcher 208, according to one embodiment. As shown, the prefetcher 208 further includes a prefetch request queue 405, a phase predictor 410, a ramp selector 415, and a threshold selector 420.

In one embodiment, the prefetch request queue 405 is a tracking mechanism that tracks n streams of data accesses over m threads in a core 205. The prefetch request queue 405 maintains an amount of confirmations (i.e., actual demands for prefetched lines) observed in each of the streams. Further, the prefetch request queue 405 tracks an amount of prefetch requests issued for each stream and schedules a next appropriate prefetch request to be sent to the memory 120.

Further still, the prefetch request queue 405 may evaluate a stream depth associated with each outgoing request. Doing so allows the prefetch request queue 405 to add a confidence score to each outgoing request. The prefetch request queue 405 may then send each request to the memory controller 220. Based on an amount of requests that are already in a memory access queue and the confidence level of an incoming request, the memory controller 220 may decide whether to drop or honor the request. In addition, the threshold selector 420 may send a threshold profile to the memory controller 220 that is based on historical memory resource utilization (e.g., from the past x cycles). For instance, the threshold profile may indicate that over the last 1,000 cycles, memory resource utilization was relatively low. In such a case, the memory controller 220 may decide to honor prefetch requests at a lower threshold (e.g., given that current memory resource utilization is also relatively low).

The prefetch request queue 405 may also send confidence information to the phase predictor 410. The phase predictor 410 maintains thread-specific counters that track confidence levels of requests for streams observed in each thread. For instance, the phase predictor 410 may increment the thread-specific counter for each confident state request (i.e., requests having a confidence level that exceeds a specified threshold) and decrement the counter for each non-confident state request that the prefetcher 208 sends out. A relatively high counter can indicate that the thread is in a section of code that can benefit from prefetching. A relatively low counter can indicate that the thread is in a section of code where accesses to the memory 120 are mostly random and thus unlikely to benefit from prefetching.

The phase predictor 410 may forward counter information to the ramp selector 415. The ramp selector 415 may determine, based on the counter and current memory resource utilization (retrieved from the memory controller 220), whether to increase or decrease a rate at which prefetches occur at a given stream. For example, the ramp selector 415 may select a delayed ramp for streams associated with a low thread-specific counter if the current memory resource utilization is high. Doing so allows the processor 105 to conserve memory bandwidth when resources are constrained. In other cases, the ramp selector 415 may select an aggressive ramp for streams associated with a high counter regardless of memory resource utilization. As stated, prefetching can be beneficial to such streams due to the likelihood that the associated thread is in a section of code where memory access is sequential.

Figure 5:
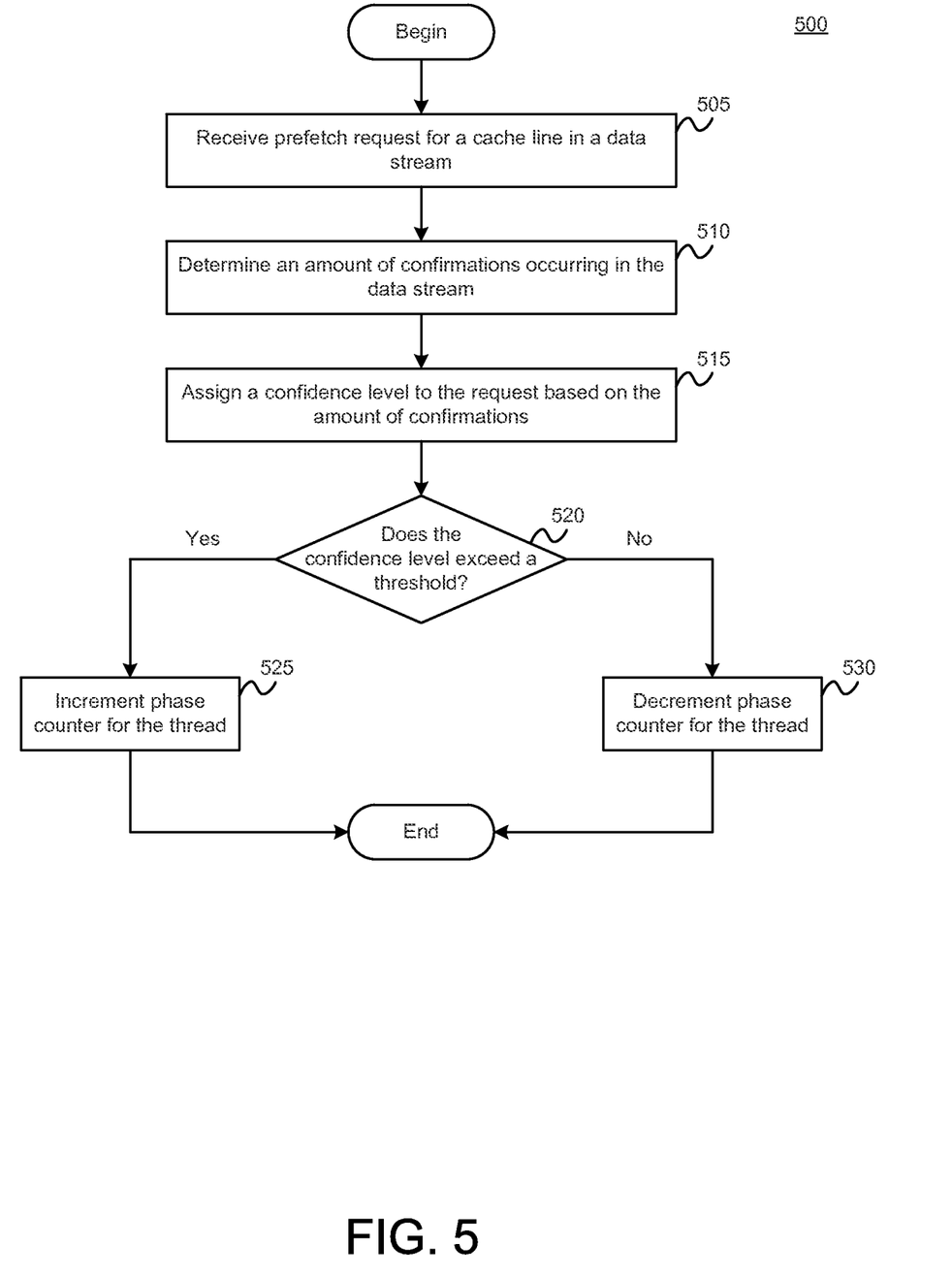
FIG. 5 illustrates a method for determining a confidence state of a prefetch request, according to one embodiment.

FIG. 5 illustrates a method 500 for determining a confidence state of a prefetch request, according to one embodiment. As shown, the method 500 begins at step 505, where the prefetch request queue 405 receives a prefetch request for a cache line in a data stream. At step 510, the prefetch request queue 405 determines an amount of confirmations occurring in the data stream. At step 515, the prefetch request queue 405 assigns a confidence level to the request based on the amount of confirmations. The prefetch request queue 405 may determine a confidence state of the request based on the assigned confidence level (at step 520). For example, if the confidence level of the request exceeds a specified threshold, then the request is in a confident state. In contrast, if the confidence level of the request does not exceed the threshold, the request is in a non-confident state.

If the confidence level exceeds a threshold, then the request is in a confident state. In such a case, at step 525, the phase predictor 410 increments a thread-specific counter associated with that thread. However, if the confidence level does not exceed the threshold, then at step 530, the phase predictor 410 decrements the counter. As stated, the counter may indicate whether streams in a given thread can benefit from prefetching (e.g., because the thread may be executing a code region that requires sequential memory accesses). Further, based on the confidence levels of a given stream, the memory controller 220 may determine which requests to drop, based on current memory constraints.

Figure 6:
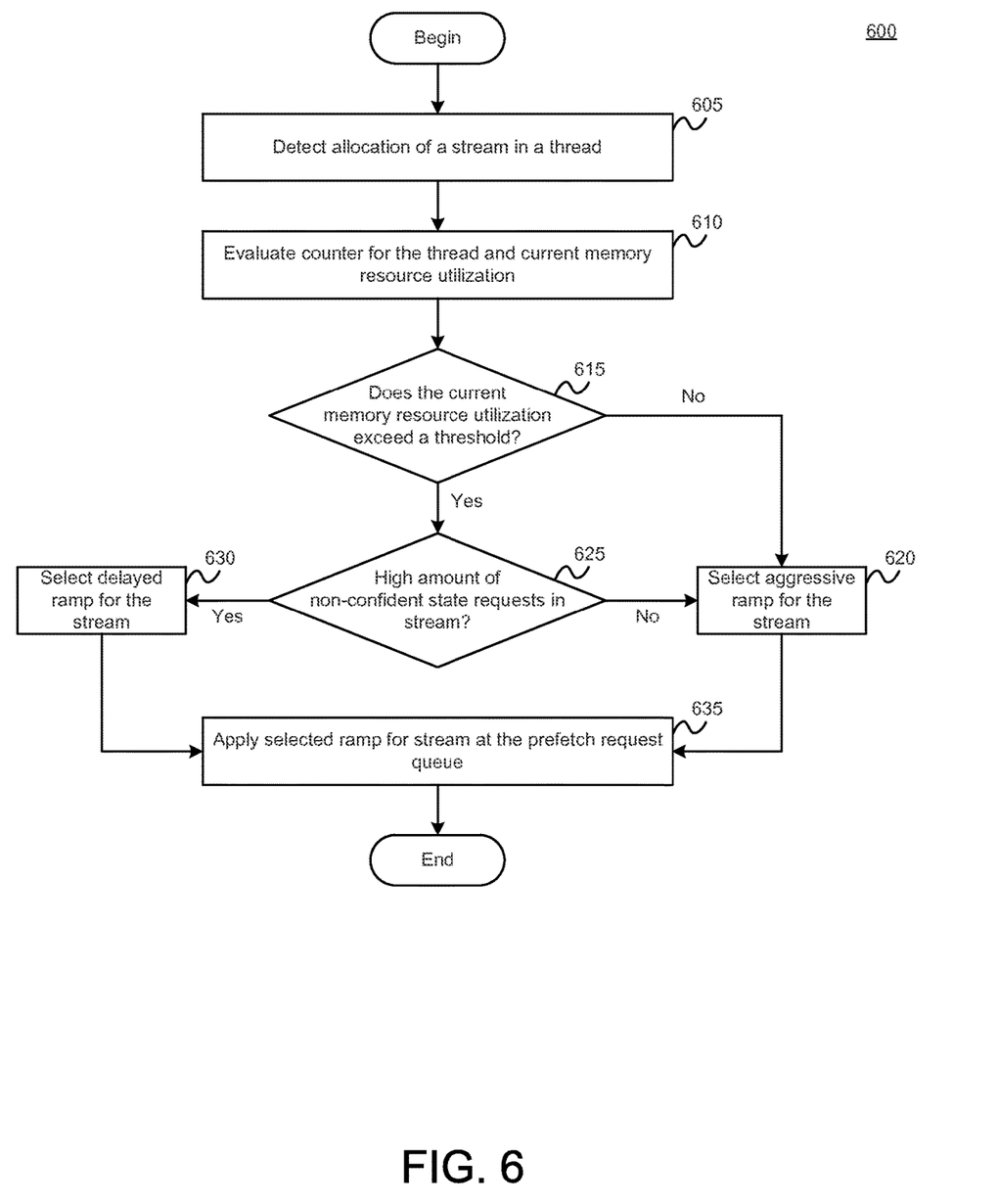
FIG. 6 illustrates a method for ramping performance of a given stream based on confidence states of prefetch requests associated with the stream, according to one embodiment.

FIG. 6 illustrates a method 600 for ramping performance of a given stream based on confidence states of prefetch requests associated with the stream, according to one embodiment. As shown, the method 600 begins at step 605, where the prefetcher 208 detects an allocation of a stream in a given thread. The phase predictor 410 may send phase counter information associated with the thread to the ramp selector 415.

At step 610, the ramp selector 415 evaluates the thread-specific counter. The ramp selector 415 may also evaluate current memory resource utilization (retrieved from the memory controller 220). At step 615, the ramp selector 415 determines whether the current memory resource utilization exceeds a threshold. That is, the ramp selector 415 determines whether the memory 120 is currently busy or constrained. If the memory 120 is not currently busy or constrained, then at step 620, the ramp selector 620 selects an aggressive ramp for the stream, i.e., determines to increase the rate at which prefetches for that stream occur. Doing so allows the prefetcher 208 to increase efficiency by using memory resources that might otherwise go unused, even if the prefetches are from streams associated with low-counter threads.

Otherwise, if the current memory resource utilization exceeds a threshold (i.e., the memory 120 is busy or constrained), then the ramp selector 415 determines whether the stream is associated with a relatively high amount of non-confident state requests at step 625. If not, then the method goes to step 620, where the ramp selector 415 selects an aggressive ramp for the stream. Otherwise, the ramp selector 415 selects a delayed ramp for the stream, i.e., decreases the rate at which prefetches occur in the stream, at step 630. At step 635, the prefetch request queue 405 applies the selected ramp for the stream.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments presented herein may be devised without departing from the basic scope thereof, and the scope thereof is determined by the claims that follow.

What is claimed is:

1. A method, comprising:
   receiving, at a pre-fetch request queue, a first request in a plurality of requests to pre-fetch data from a stream in a plurality of streams;
   assigning, at the pre-fetch request queue, a confidence level to the first request based on an amount of confirmations observed in the stream, wherein the confirmations comprise demands for pre-fetched data in the stream, wherein the first request is in a confident state if the confidence level exceeds a specified value and wherein the first request is in a non-confident state if the confidence level does not exceed the specified value;
   determining whether to drop the first request from the pre-fetch request queue, based on the confidence level and a memory resource utilization threshold;
   prioritizing requests to pre-fetch data in the plurality of requests having a higher confidence level than the confidence level of the first request to pre-fetch data by:
      maintaining a phase prediction counter for the stream at a phase predictor based on a plurality of assigned confidence levels for requests in the stream, wherein the assigned confidence levels are received at the phase predictor from the pre-fetch request queue and are based on the amount of confirmations observed in the stream, wherein the phase prediction counter is maintained by:
         incrementing the phase prediction counter when one of the requests in the stream is in an assigned confident state assigned by the pre-fetch request queue; and
         decrementing the phased prediction counter when one of the requests in the stream is in an assigned non-confident state assigned by the pre-fetch request queue;
      determining whether to increase or decrease a rate at which pre-fetches from the stream occur based on the phase prediction counter for the stream and a current memory resource utilization; and
   pre-fetching one or more requests in the plurality of requests according to the rate at which pre-fetches from the stream occur and a priority associated with the one or more requests, wherein the one or more requests are not dropped requests.

2. The method of claim 1, further comprising:
   upon determining that the current memory resource utilization is below a specified threshold, increasing the rate at which the pre-fetches occur.

3. The method of claim 1, further comprising, prior to determining whether to drop the first request:

selecting the memory resource utilization threshold based on memory resource utilization during a specified amount of past cycles.

4. The method of claim 1, further comprising:
upon determining that the confidence level does not exceed the specified value, dropping the first request.

5. A processor, comprising:
a prefetcher configured to:
receive, at a pre-fetch request queue, a first request in a plurality of requests to pre-fetch data from a stream in a plurality of streams,
assign, at the pre-fetch request queue, a confidence level to the first request based on an amount of confirmations observed in the stream, wherein the confirmations comprise demands for pre fetched data in the stream, wherein the first request is in a confident state if the confidence level exceeds a specified value and wherein the first request is in a non-confident state if the confidence level does not exceed the specified value,
determine whether to drop the first request from the pre-fetch request queue, based on the confidence level and a memory resource utilization threshold;
prioritize requests to pre-fetch data in the plurality of requests having a higher confidence level than the confidence level of the first request to pre-fetch data by
maintain a phase prediction counter for the stream at a phase predictor based on a plurality of assigned confidence levels for requests in the stream, wherein the plurality of assigned confidence levels are received at the phase predictor from the pre-fetch request queue and are based on the amount of confirmations observed in the stream, wherein the phase prediction counter is maintained by:
incrementing the phase prediction counter when one of the requests in the stream is in an assigned confident state assigned by the pre-fetch request queue; and
decrementing the phased prediction counter when one of the requests in the stream is in an assigned non-confident state assigned by the pre-fetch request queue;
determine whether to increase or decrease a rate at which pre-fetches from the stream occur based on the phase prediction counter for the stream and a current memory resource utilization; and
pre-fetch one or more requests in the plurality of requests according to the rate at which pre-fetches from the stream occur and a priority associated with the one or more requests, wherein the one or more requests are not dropped requests.

6. The processor of claim 5, wherein the prefetcher is further configured to:
upon determining that the current memory resource utilization is below a specified threshold, increase the rate at which the pre-fetches occur.

7. The processor of claim 5, wherein the prefetcher is further configured to, prior to determining whether to drop the first request:
select the memory resource utilization threshold based on memory resource utilization during a specified amount of past cycles.

8. The processor of claim 5, wherein the prefetcher is further configured to:
upon determining that the confidence level does not exceed the specified value, drop the first request.

9. A system, comprising:
a memory; and
a processor, comprising:
a prefetcher configured to:
receive, at a pre-fetch request queue, a first request in a plurality of requests to pre-fetch data from a stream in a plurality of streams,
assign, at the pre-fetch request queue, a confidence level to the first request based on an amount of confirmations observed in the stream, wherein the confirmations comprise demands for pre fetched data in the stream, wherein the first request is in a confident state if the confidence level exceeds a specified value and wherein the first request is in a non-confident state if the confidence level does not exceed the specified value,
determine whether to drop the first request from the pre-fetch request queue based on the confidence level and a memory resource utilization threshold;
prioritize requests to pre-fetch data in the plurality of requests having a higher confidence level than the confidence level of the first request to pre-fetch data by:
maintain a phase prediction counter for the stream at a phase predictor based on a plurality of assigned confidence levels for the requests in the stream, wherein the plurality of assigned confidence levels are received at the phase predictor from the pre-fetch request queue and are based on the amount of confirmations observed in the stream, wherein the phase prediction counter is maintained by:
incrementing the phase prediction counter when one of the requests in the stream is an assigned confident state assigned by the pre-fetch request queue; and
decrementing the phased prediction counter when one of the requests in the stream is in an assigned non-confident state assigned by the pre-fetch request queue;
determine whether to increase or decrease a rate at which pre-fetches from the stream occur based on the phase prediction counter for the stream and a current memory resource utilization; and
pre-fetch one or more requests in the plurality of requests according to the rate at which pre-fetches from the stream occur and a priority associated with the one or more requests, wherein the one or more requests are not dropped requests.

10. The system of claim 9, wherein the prefetcher is further configured to:
upon determining that the current memory resource utilization is below a specified threshold, increase the rate at which the pre-fetches occur.

11. The system of claim 9, wherein the prefetcher is further configured to, prior to determining whether to drop the first request:
select the memory resource utilization threshold based on memory resource utilization during a specified amount of past cycles.

* * * * *